US012138817B2

(12) United States Patent
Westerhof et al.

(10) Patent No.: US 12,138,817 B2
(45) Date of Patent: Nov. 12, 2024

(54) HAIR-CUTTING APPLIANCE COMPRISING A GUARD ELEMENT

(71) Applicant: KONINKLIJKE PHILIPS N.V., Eindhoven (NL)

(72) Inventors: Willem Auke Westerhof, Drachten (NL); Jan Van Dalen, Donkerbroek (NL); Martinus Bernardus Stapelbroek, Frieschepalen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 188 days.

(21) Appl. No.: 17/615,608

(22) PCT Filed: Jun. 18, 2020

(86) PCT No.: PCT/EP2020/066842

§ 371 (c)(1),
(2) Date: Dec. 1, 2021

(87) PCT Pub. No.: WO2020/254453

PCT Pub. Date: Dec. 24, 2020

(65) Prior Publication Data

US 2022/0305684 A1 Sep. 29, 2022

(30) Foreign Application Priority Data

Jun. 21, 2019 (EP) .................................... 19181715

(51) Int. Cl.
*B26B 19/14* (2006.01)

(52) U.S. Cl.
CPC .......... *B26B 19/143* (2013.01); *B26B 19/148* (2013.01)

(58) Field of Classification Search
None
See application file for complete search history.

(56) References Cited

U.S. PATENT DOCUMENTS 2,164,581 A 7/1939 Ewald
2,212,624 A 8/1940 Testi
(Continued)

FOREIGN PATENT DOCUMENTS

DE 4130580 A1 3/1993
EP 0705158 B1 8/1998
(Continued)

OTHER PUBLICATIONS

International Search Report and Written Opinion Dated Oct. 2, 2020 for International Application No. PCT/EP2020/066842 Filed Jun. 18, 2020.

*Primary Examiner* — Hwei-Siu C Payer

(57) ABSTRACT

A hair-cutting appliance comprising at least 19 hair-cutting units (10), each comprising a guard element (20) and a rotatably arranged hair-cutting element (15) having at least one hair-cutting edge (16), is provided. The hair-cutting units of the hair-cutting appliance are relatively small, a base of the guard element having a diameter in a range of 7 mm to 13 mm. In order to have a relatively small guard element (20) which is of robust and uncomplicated design, and which is capable of contributing to excellent hair-cutting results without causing skin irritation, it is proposed to let both an inner surface (35) and an outer surface (36) of an annular shaving track (30) of the guard element (20) have a conical shape relative to a central axis (21) of the guard element (20), in a similar slanting orientation relative to the central axis (21), in at least a hair-cutting portion of the shaving track (30).

12 Claims, 5 Drawing Sheets

(56) References Cited

U.S. PATENT DOCUMENTS

| | | | | |
|---|---|---|---|---|
| 2,331,873 | A | 10/1943 | Thews | |
| 2,533,979 | A * | 12/1950 | Vivie | B26B 19/143 30/346.51 |
| 3,264,733 | A * | 8/1966 | Tiemes et al. | B26B 19/384 30/346.51 |
| 3,292,251 | A | 12/1966 | Eppe | |
| 3,381,373 | A | 5/1968 | Brown | |
| 4,393,586 | A * | 7/1983 | Hamashima | B26B 19/14 30/346.51 |
| 4,635,360 | A * | 1/1987 | Tanahashi | B26B 19/14 30/34.2 |
| 5,867,908 | A | 2/1999 | Van Veen | |
| 11,079,382 | B2 | 8/2021 | Sebastiao | |
| 2006/0179658 | A1* | 8/2006 | Nakano | B26B 19/143 30/43.6 |
| 2017/0239825 | A1 | 8/2017 | Julemont | |
| 2017/0368699 | A1 | 12/2017 | Schuebel | |
| 2020/0061857 | A1* | 2/2020 | Silvius | B26B 19/384 |
| 2022/0305684 | A1* | 9/2022 | Westerhof | B26B 19/14 |

FOREIGN PATENT DOCUMENTS

| | | | |
|---|---|---|---|
| EP | 3260251 | A1 | 12/2017 |
| FR | 2430829 | A1 | 2/1980 |
| GB | 657037 | A | 9/1951 |
| GB | 2448699 | A | 10/2008 |
| JP | S4330685 | Y | 12/1968 |
| JP | S52121457 | U | 9/1977 |
| JP | S54123362 | A | 9/1979 |
| WO | 2003059584 | A1 | 7/2003 |
| WO | 2015124001 | A1 | 8/2015 |

* cited by examiner

HAIR-CUTTING APPLIANCE COMPRISING A GUARD ELEMENT

CROSS REFERENCE TO RELATED APPLICATIONS

This application is the U.S. National Phase application under 35 U.S.C. § 371 of International Application No. PCT/EP2020/066842 filed Jun. 18, 2020, which claims the benefit of European Patent Application Number 19181715.4 filed Jun. 21, 2019. These applications are hereby incorporated by reference herein.

FIELD OF THE INVENTION

The invention relates to a hair-cutting appliance comprising at least 19 hair-cutting units each comprising a guard element and a rotatably arranged hair-cutting element having at least one hair-cutting edge, wherein the guard element is configured as a guard for the hair-cutting element and arranged in the hair-cutting unit to cover the hair-cutting element, wherein the guard element is generally cup-shaped and comprises a base and an annular wall extending from the base, wherein a diameter of the base is in a range of 7 mm to 13 mm, and wherein the base includes a shaving track which: is annular about a central axis of the guard element; is provided with a plurality of hair-entry slits; has an inner surface at a side facing the hair-cutting element in the hair-cutting unit, and an outer surface at an opposite side; and has a hair-cutting portion which is designed to cover the hair-cutting element in the hair-cutting unit at the position of an annular hair-cutting track followed by the at least one hair-cutting edge of the hair-cutting element during rotation of the hair-cutting element.

BACKGROUND OF THE INVENTION

The invention is in the field of hair-cutting appliances, particularly electric hair-cutting appliances of a rotary type which are designed to perform shaving actions and the like in which hairs are cut at a position close to the skin by means of one or more rotatably arranged hair-cutting elements having at least one hair-cutting edge. In general, such a hair-cutting appliance comprises a head where one or more hair-cutting units are located. A particularly common design uses three hair-cutting units in an equilateral triangular configuration. Each hair-cutting unit comprises a hair-cutting element and a guard element which is arranged to cover the hair-cutting element, the guard element being provided with a series of hair-entry apertures for allowing hairs to reach through the guard element and encounter the hair-cutting element during a hair-cutting action. In a practical design, the guard element is generally cup-shaped and has a substantially circular periphery, wherein the hair-entry apertures may be shaped like elongated slits extending substantially radially with respect to a central axis of the guard element, in one or more annular areas referred to as shaving tracks.

The guard element has an inner surface for facing the hair-cutting element in a hair-cutting unit, and an outer surface for contacting the skin at the position of the shaving track(s) during a hair-cutting action. At positions where the hair-entry apertures are delimited by material of the guard element, cutting surfaces are present in the guard element. During a hair-cutting action, each of the hairs entering a hair-entry aperture is sheared between a cutting surface of the guard element and a hair-cutting edge of the hair-cutting element, and is cut as a result thereof. Proper use of the hair-cutting appliance involves putting the appliance to an active state, i.e. a state in which the hair-cutting element of the at least one hair-cutting unit is rotated, and moving the head over a skin area which is to be subjected to a hair-cutting action.

US 2017/0239825 A1 and DE 41 30 580 A1 both disclose an electric hair-cutting device for trimming or cutting hairs growing in the nose or ear cavities. Both known devices comprise a single hair-cutting unit. The hair-cutting unit of the device disclosed in US 2017/0239825 A1 has a guard with an inner surface and an outer surface that both have a conical shape with a straight outline relative to a central axis of the guard. The hair-cutting unit of the device of DE 41 30 580 A1 comprises an elongated shaving foil with hair-entry openings covering a rotatable inner cutter. The foil has a main direction of extension parallel to an axis of rotation of the inner cutter. The inner cutter has a diameter between 5 and 15 mm.

In the field of electric rotary shavers, it is commonly known to have three hair-cutting units in a shaver, as mentioned earlier. In practice, embodiments of electric rotary shavers are known in which the hair-cutting units are dimensioned such that a diameter of a base of the generally cup-shaped guard element is about 20.5 mm. Those practical embodiments of electric rotary shavers are known to have limits as far as a capability to follow facial contours and an effectiveness of shaving strokes are concerned. A configuration with improved performance in respect of the two performance parameters as mentioned is a pin-bed-like configuration in which hair-cutting units of smaller dimensions are applied. For example, the diameter of the base of the guard element may be 9 mm instead of 20.5 mm. Typically, a pin-bed shaver comprises more than three hair-cutting units, wherein the number of hair-cutting units may even be significantly larger, such as 19 or 37, or even 61. Such a pin-bed shaver of the type as mentioned here before in the section "field of the invention" is disclosed in EP 3 260 251 A1.

SUMMARY OF THE INVENTION

It is an object of the invention to provide a pin-bed shaver with a suitable guard element. In the context of the invention, it appears that simply scaling down the larger guard elements from known shavers does not yield satisfactory results and even results in a guard element which cannot function properly. Thus, there is a need for having a guard element which is of smaller dimensions yet is capable of contributing to excellent hair-cutting/shaving results during an acceptable lifespan.

In view of the foregoing, the invention provides a hair-cutting appliance comprising at least 19 hair-cutting units each comprising a guard element and a rotatably arranged hair-cutting element having at least one hair-cutting edge, wherein the guard element is configured as a guard for the hair-cutting element and arranged in the hair-cutting unit to cover the hair-cutting element, wherein the guard element is generally cup-shaped and comprises a base and an annular wall extending from the base, wherein a diameter of the base is in a range of 7 mm to 13 mm, wherein the base includes a shaving track which: is annular about a central axis of the guard element; is provided with a plurality of hair-entry slits; has an inner surface at a side facing the hair-cutting element in the hair-cutting unit, and an outer surface at an opposite side; and has a hair-cutting portion which is designed to cover the hair-cutting element in the hair-cutting unit at the position of an annular hair-cutting track followed by the at least one hair-cutting edge of the hair-cutting element during rotation of the hair-cutting element; wherein, in at least the hair-cutting portion of the shaving track and as seen in a longitudinal section of the guard element including the central axis, at either side of the central axis both the inner surface and the outer surface of the shaving track have: a conical shape relative to the central axis with a similar slanting orientation relative to the central axis; and a straight outline, wherein the inner surface of the shaving track is oriented relative to the central axis at an inclination angle which is in a range of 45° to 78°.

It follows from the above definition that, in the hair-cutting appliance according to the invention, the guard element is generally cup-shaped, wherein a diameter of a base of the guard element is in a range of 7 mm to 13 mm. On the basis of such diameter size, it is very well possible for the guard element to be used in a pin-bed configuration. Further, in at least a hair-cutting portion of the shaving track, both the inner surface and the outer surface of the shaving track have a conical shape relative to the central axis of the guard element, in a similar slanting orientation relative to the central axis, wherein both the inner surface and the outer surface of the shaving track have a straight outline and an inclination angle of the shaving track to the central axis at the side of the inner surface is in a range of 45° to 78° as seen in a longitudinal section of the guard element including the central axis, at either side of the central axis.

The particular conical shape of the inner surface and the outer surface of the shaving track at the position of at least the hair-cutting portion of the shaving track contributes to realizing an advantageous distribution of pressure on the guard element when the guard element is made to contact a skin area in an actual hair-cutting action. The hair-cutting units are not only relatively small in a pin-bed configuration, but the hair-cutting units are also arranged at a relatively short distance with respect to each other. As a consequence, there is no room for a surrounding rim to control pressure at a peripheral rim of the guard element at the position in the guard element where the annular wall connects to the base. By providing at least a portion of the outer surface of the shaving track with a conical shape as defined in the foregoing, it is achieved that the peripheral rim of the guard element can be lowered with respect to a central portion of the base in an uncomplicated manner. As a result, pressure on the guard element resulting from pressing the guard element on a skin area is more evenly distributed on the guard element, and the effect of stress relief on the peripheral rim becomes even stronger when the guard element is moved over the skin area.

Further, the particular conical shape of the inner surface and the outer surface of the shaving track at the position of at least the hair-cutting portion of the shaving track contributes to realizing an advantageous option of bearing the hair-cutting element. As compared to a conventional guard element having larger dimensions, in the hair-cutting appliance according to the invention the guard element offers only limited space for having a central bearing for the cutting element as involved in the design of the conventional guard element. Providing at least a portion of the inner surface of the shaving track with a conical shape as defined in the foregoing appears to offer an advantageous possibility of enabling a self-centering functionality of the hair-cutting element in the guard element, on the basis of which the central bearing can be omitted.

It is also to be noted that in a pin-bed configuration including quite a number of hair-cutting units, it is even more important to have low manufacturing costs per hair-cutting unit than in the commonly known configuration including a limited number of larger hair-cutting units. Realizing a conical shape of both the inner surface and the outer surface of the shaving track at the position of at least the hair-cutting portion of the shaving track does not need to involve complex manufacturing steps, all the more since it is intended to let the surfaces have a straight outline.

All in all, in a hair-cutting appliance according to the invention, a guard element of relatively small size is provided, in which the shaving track is shaped in a particular way, so that at least the hair-cutting portion of the shaving track has a conical appearance. In at least the hair-cutting portion of the shaving track, both the inner surface and the outer surface of the shaving track are in a similar slanting orientation relative to the central axis, wherein the surfaces may or may not extend parallel to each other, whatever is practical in a given situation for obtaining the effects of relieving pressure and offering a possibility of enabling a self-centering functionality of the hair-cutting element without needing to have some kind of bearing as explained in the foregoing.

In the hair-cutting appliance according to the invention, in which at least the hair-cutting portion of the shaving track of the guard element has a conical appearance, the overall shape of the base may be the shape of a truncated cone. Any practical further design aspect may be applicable to the guard element. For example, the base may be provided with a central opening. In the art, it is known to have more than one shaving track in a guard element for use in an electric rotary shaver. In the guard element according to the invention, in view of the relatively small size of the guard element, it is most practical to have only one shaving track.

It may particularly be advantageous if, in at least the hair-cutting portion of the shaving track, the inclination angle of the inner surface of the shaving track is in a range of 60° to 75° and/or, in at least the hair-cutting portion of the shaving track and as seen in the longitudinal section of the guard element, at either side of the central axis the outer surface of the shaving track is oriented relative to the central axis at an inclination angle which is in a range of 90° to 120°. For the sake of clarity, in respect of the phrase “as seen in a longitudinal section of the guard element, at either side of the central axis” as used in defining the invention, it is noted that, as the shaving track is annular, two sections of the shaving track which are opposite to each other about the central axis are included in a longitudinal section of the guard element, wherein in a practical case of the guard element being rotation-symmetric around the central axis, the two sections of the shaving track are mirrored about the central axis. In any case, the features of i) the straight outline of both the inner surface and the outer surface in at least the hair-cutting portion of the shaving track and ii) the range of the inclination angle of the shaving track to the central axis at the side of the slanting inner surface are applicable to each of both sections of the shaving track in the longitudinal section. Further, the term “longitudinal section” is to be understood such that the definition of the invention is interpreted by imagining a view on a section of the guard element that might be obtained if the generally cup-shaped guard element would actually be cut in half.

As is generally known in the field of guard elements for use in hair-cutting units further including a rotatable hair-cutting element having at least one hair-cutting edge, it may be so that the shaving track includes hair-entry slits having a main extension in a radial direction relative to the central axis, and elongated lamellae extending between the hair-entry slits. According to the invention, in the relatively small embodiment of the guard element which is provided, it is advantageous if at least some of the hair-entry slits have a width distribution according to which a width of the respective hair-entry slits increases in a radially outward direction along at least a major portion of a length of the respective hair-entry slits, and if at least some of the lamellae have a thickness distribution in which a thickness of the respective lamellae increases in the radially outward direction along at least a major portion of a length of the respective lamellae.

In the context of the invention, it was found that one of the main issues of significantly reducing the size of the guard element resides in the fact that a difference of a ratio of slit width and guard element diameter for an inner periphery of the shaving track and an outer periphery of the shaving track is much bigger in a small-sized guard element than in a normal-sized guard element. This is at least the case when a minimal slit length of 2.5 mm is maintained, which is advantageous in view of guaranteeing hair catching to a sufficient extent as well as a high hair-cutting probability. A diameter of the inner periphery of the shaving track determines the amount of hair-entry slits which can be fitted in the guard element. For example, in a guard element having a base of 9 mm diameter, a diameter of an outer periphery of the shaving track can be 9 mm at the maximum, and the diameter of the inner periphery of the shaving track is 4 mm when a slit length of 2.5 mm is applied. In a conventional guard element in which a diameter of an outer periphery of the shaving track can be as large as 20.5 mm, the diameter of the inner periphery of the shaving track is 15.5 mm, resulting in almost 4 times the amount of hair-entry slits. Assuming a certain effective minimum width of the hair-entry slits, this results in a much better ratio of total hair-entry area and material of the shaving track.

In the context of the invention, a solution for the unfavorable ratio of the small-sized guard element was found in not having a constant slit width over the length of the hair-entry slits, but having a larger slit width at the outer periphery of the shaving track. In order to avoid increased skin doming and an associated higher risk of skin cutting and skin irritation at the outer periphery of the shaving track, a lamella thickness is chosen so as to be larger when the slit width is larger, and to be smaller when the slit width is smaller. In particular, the design of the guard element according to the invention can be such that when compared to the design of a conventional guard element, both the slit width and the lamella thickness are of a standard value at the inner periphery of the shaving track and of a larger value at the outer periphery of the shaving track.

In view of what has been disclosed about the possible relation between slit width and lamella thickness, it is noted that it may be so that along at least the major portion of the length of the respective lamellae, in each radial position the thickness of the respective lamellae is proportional to the width of the hair-entry slits. It may be practical for a ratio between a local slit width and a local lamella thickness, i.e. a value following from dividing the local slit width by the local lamella thickness, to be between 2.2 and 6. The ratio may be constant along the length of the respective hair-entry slits, but it is also possible for the ratio to increase in a radially inward direction, as skin pressure and thus skin doming is largest at a most outside radial position.

Further, it is very practical if the respective hair-entry slits are tapered in the radially inward direction. Contrariwise, the respective lamellae may have a substantially constant width along at least the major portion of their length. In any case, in order to maintain a sufficiently high occurrence level of entry of hairs through the hair-entry slits, it is preferred for the width of the respective hair-entry slits to be at least 250 μm at any radial position.

Preferably, as seen in the longitudinal section of the guard element, the at least one hair-cutting edge of the hair-cutting element has a shape which is complementary to the shape of the inner surface of the shaving track of the guard element at the position of at least the hair-cutting portion of the shaving track. In that way, the self-centering functionality of the hair-cutting element as described in the foregoing may be realized, so that there is no need for one or more bearing components in the guard element. Further, it may be practical for the hair-cutting element to comprise a number of legs and a support structure for supporting the legs, wherein each of the legs extends towards the inner surface of the shaving track of the guard element and includes a hair-cutting edge, and wherein the number of the legs is three, four or five. If so desired, the number of legs may be more than five, up to a practical maximum such as nine.

In order to achieve a sufficient hair-cutting frequency in a hair-cutting unit of the hair-cutting appliance according to the invention, it is advantageous if the hair-cutting appliance according to the invention comprises a driving mechanism configured to act on the hair-cutting element of at least one hair-cutting unit for realizing rotation of the hair-cutting element during operation of the hair-cutting appliance at a rotation speed resulting in a frequency of the at least one hair-cutting edge of the hair-cutting element passing the respective hair-entry slits of the guard element being in a range of 315-535 passes per second. The range as mentioned follows from a comparison to a known electric rotary shaver which is equipped with hair-cutting units in which the hair-cutting element may have 9 to 15 legs including a hair-cutting edge and is rotated at 2,100 rpm. In order to maintain the number of passes per second of a hair-cutting edge at a hair-entry slit when decreasing the number of legs of the hair-cutting element to 3 to 5, for example, it is necessary to increase the rotation speed of the hair-cutting element. In this example, a new value of the rotation speed of about 6,300 rpm may be applicable.

The above-described and other aspects of the invention will be apparent from and elucidated with reference to the following detailed description of a guard element for use in a hair-cutting unit of a hair-cutting appliance according to the invention, particularly a shaving appliance comprising a large number of hair-cutting units in a pin-bed configuration.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
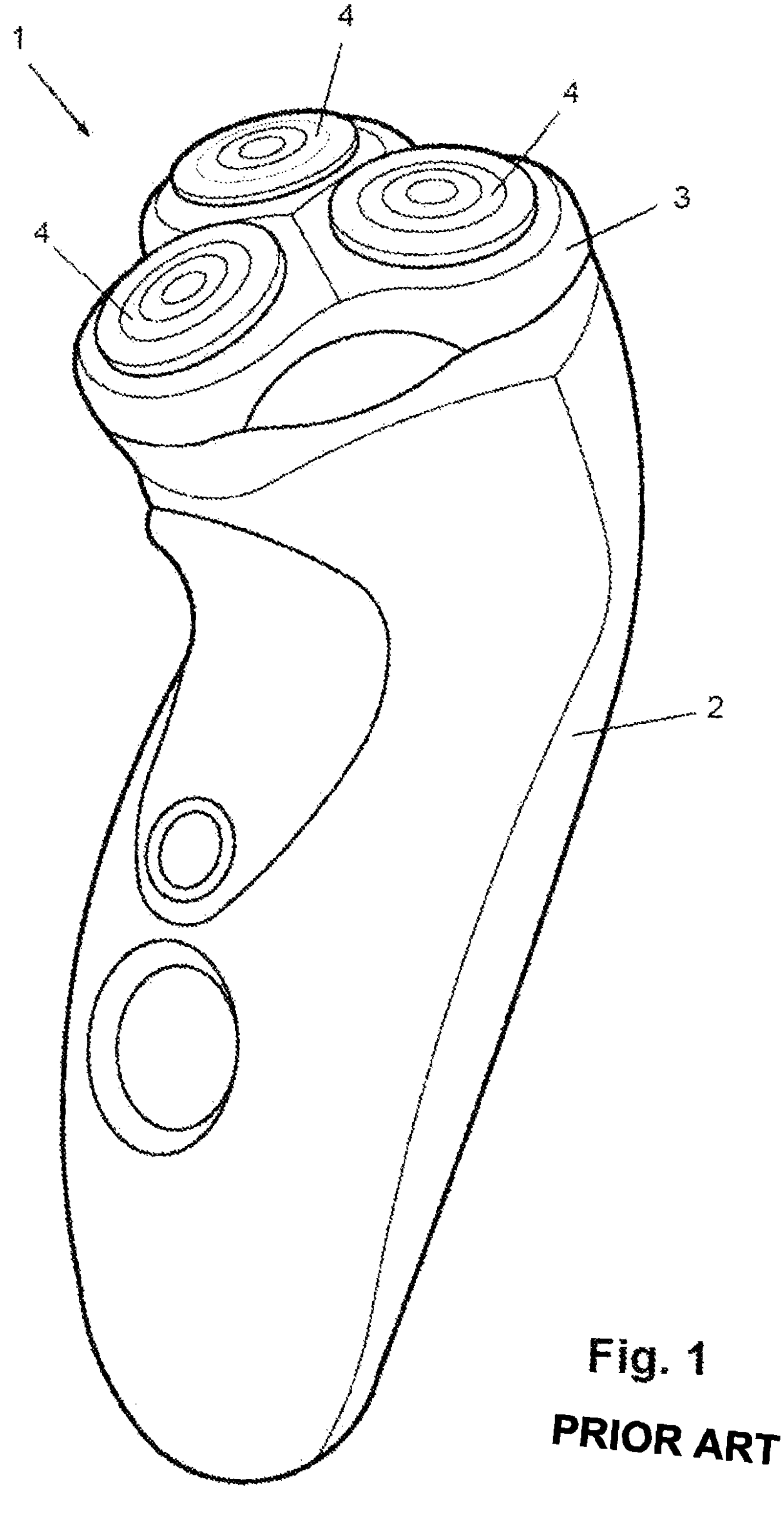
Fig. 1 PRIOR ART
FIG. 1 diagrammatically shows a perspective view of a conventional hair-cutting appliance.

FIG. 1 relates to a conventional hair-cutting appliance. In the figure, an electric rotary shaver 1 is shown, which comprises a body 2 and a head 3. The head 3 may be removably or hingably mounted to the body 2. The body 2 of the electric rotary shaver 1 is also commonly referred to as handle. In the shown example, three hair-cutting units 4 are disposed in the head 3. When the electric rotary shaver 1 is applied for the purpose of subjecting a skin area to a shaving action, the actual process of cutting off hairs protruding from the skin area takes place at the position of the hair-cutting units 4.

Figure 2:
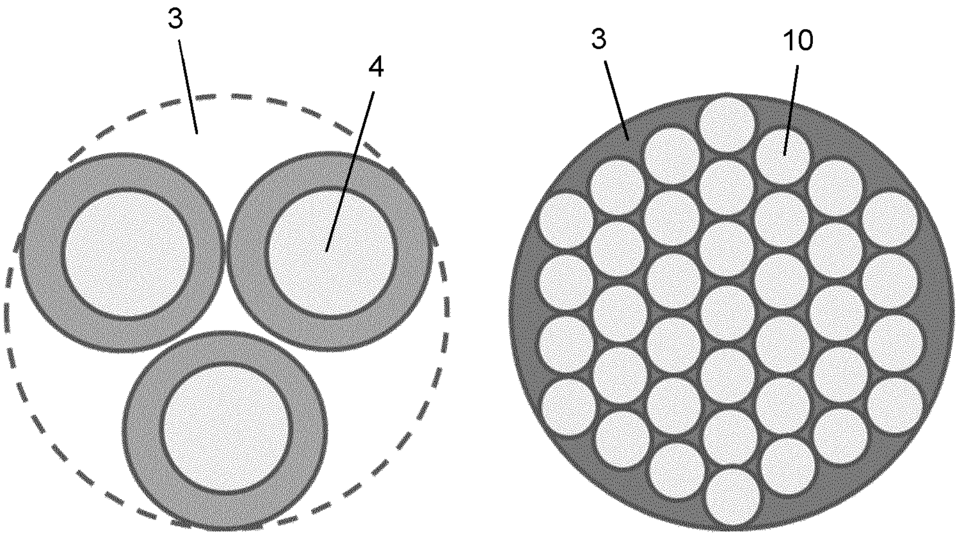
FIG. 2 illustrates a comparison between a conventional configuration and a pin-bed configuration of hair-cutting units in a hair-cutting appliance according to the invention.
Figure 3:
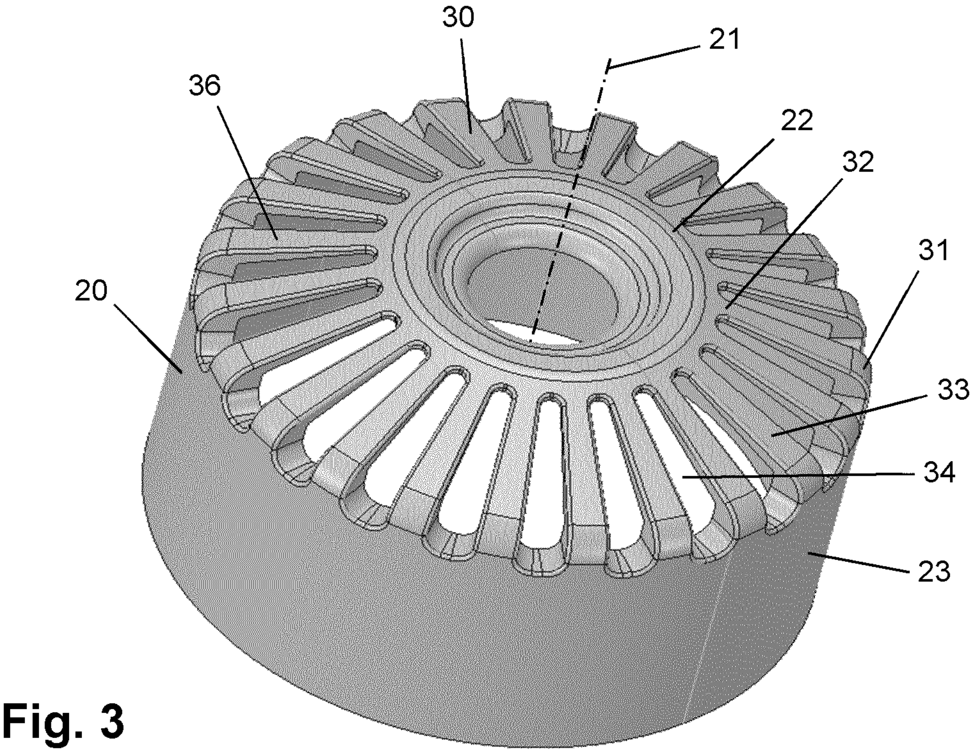
FIG. 3 diagrammatically shows a perspective view of a guard element according to an embodiment of the invention, which is intended to be used in a hair-cutting unit of the hair-cutting appliance according to the invention.
Figure 4:
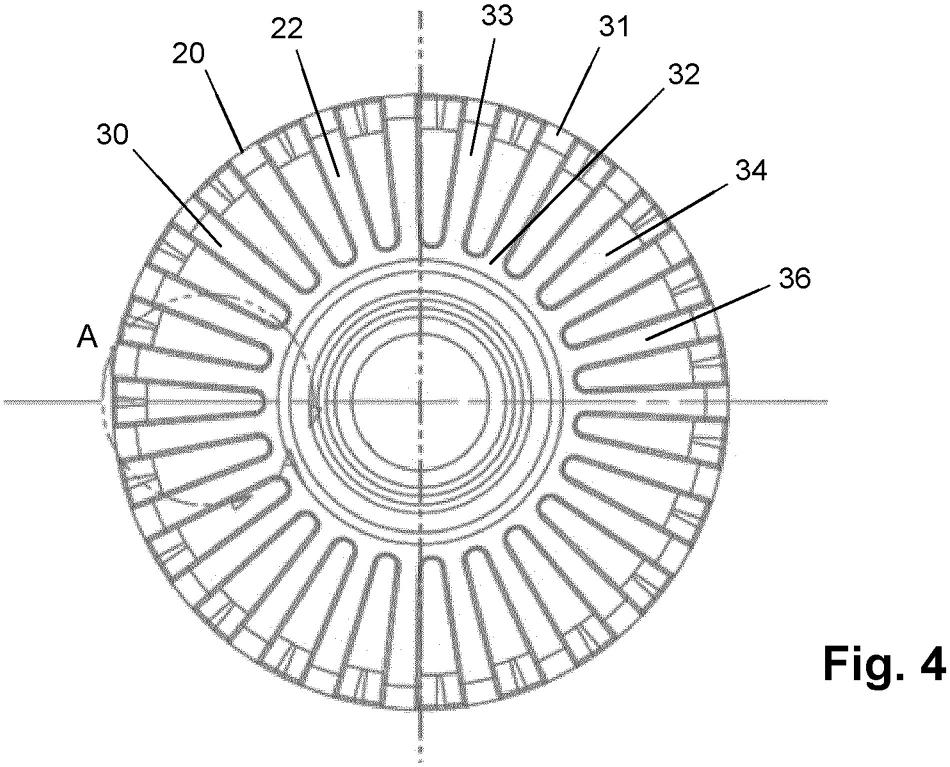
FIG. 4 diagrammatically shows a top view of the guard element.

It may be desirable to arrange more than three hair-cutting units 4 in the head 3 for the reason of improving performance when it comes to following facial contour and realizing effective shaving strokes, for example. In particular, it may be desirable to equip the head 3 with a plurality of relatively small hair-cutting units 10 in a pin-bed configuration. In this respect, FIG. 2 illustrates a comparison between a conventional configuration and such a pin-bed configuration of hair-cutting units in a hair-cutting appliance according to the invention. In the shown example of the pin-bed configuration, 37 hair-cutting units 10 are disposed in the head 3, which does not alter the fact that other numbers of hair-cutting units 10 may be chosen. It follows from an interpretation of the figure that more of the total area of the head 3 is effectively covered by the plurality of hair-cutting units 10 in the pin-bed configuration than by the three hair-cutting units 4 in the conventional configuration. It may be practical for an outer diameter of the relatively small hair-cutting units 10 to be about two to two and a half times smaller than an outer diameter of the conventional, relatively large hair-cutting units 4.

Figure 5:
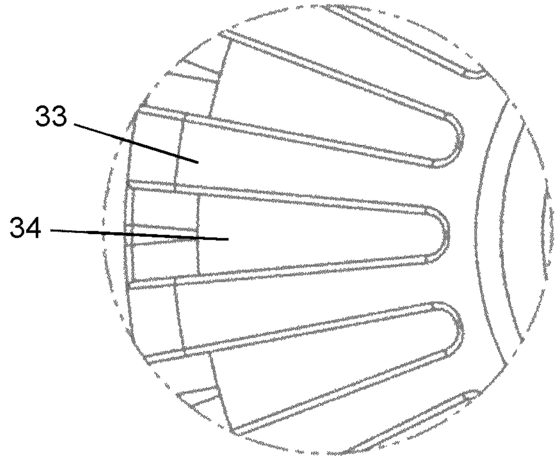
FIG. 5 is an enlarged detail A of FIG. 4.
Figure 6:
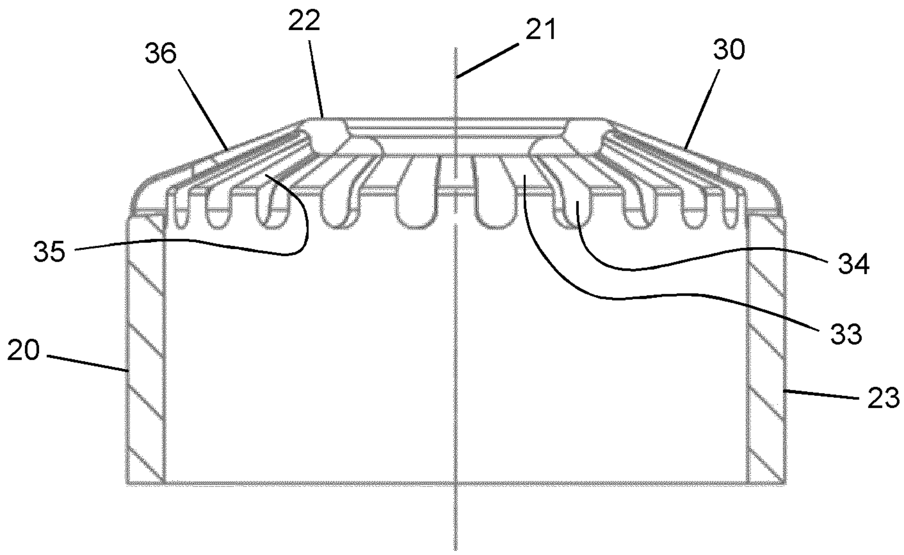
FIG. 6 diagrammatically shows a view of a longitudinal section of the guard element including a central axis of the guard element.
Figure 7:
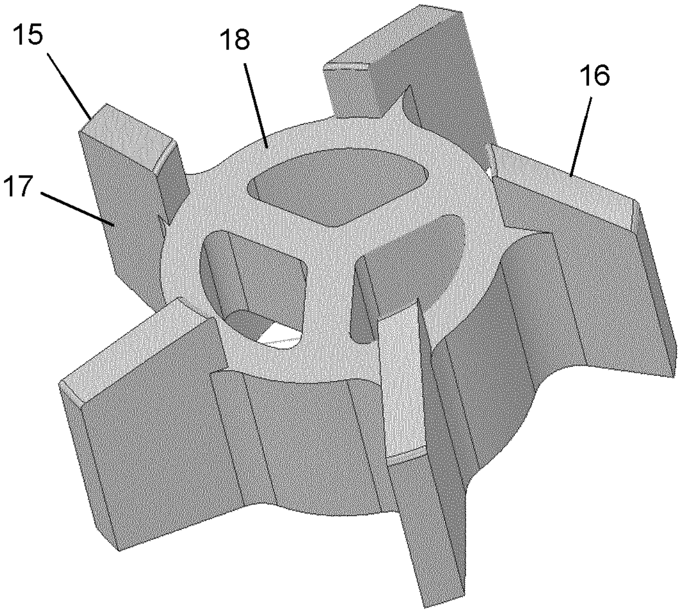
FIG. 7 diagrammatically shows a perspective view of a hair-cutting element which is designed to be combined with the guard element in a hair-cutting unit of the hair-cutting appliance according to the invention.

FIGS. 3-6 and 8 relate to a guard element 20 which is suitable to be used in a relatively small hair-cutting unit 10 of a hair-cutting appliance according to the invention of the rotary type, and FIG. 7 relates to a hair-cutting element 15 which is suitable to be combined with the guard element 20 in the hair-cutting unit 10 and which is designed for rotary arrangement. For the sake of clarity, it is noted that the guard element 20 as will now be described is only one of numerous embodiments which are covered by the invention, and that details of the design of this particular guard element 20 which are outside of the basic definition of the guard element provided in the claims are not to be understood so as to be limiting to the invention, wherein it is further noted that details which may be considered independently by a skilled person are not to be understood so as to be inextricably correlated even though they are disclosed with reference to a single example, unless an indication to the contrary is explicitly given. Likewise, the hair-cutting element 15 as will now be described is only one of numerous embodiments which are covered by the invention, and that details of the design of this particular hair-cutting element 15 which are outside of the basic definition of the hair-cutting element provided in the claims are not to be understood so as to be limiting to the invention, wherein it is further noted that details which may be considered independently by a skilled person are not to be understood so as to be inextricably correlated even though they are disclosed with reference to a single example, unless an indication to the contrary is explicitly given.

The guard element 20 is of a generally cup-shaped design, having a substantially circular periphery and a central axis 21, whereby the guard element 20 is suitable for at least partially accommodating the hair-cutting element 15 in its interior. In the cup-shaped design, the guard element 20 comprises a base 22 and an annular wall 23 extending from the base 22. The guard element 20 is provided with an annular shaving track 30 for contacting the skin of a user during a shaving action, the annular shaving track 30 having two concentrically arranged peripheral rims, namely an outer peripheral rim 31 and an inner peripheral rim 32. The guard element 20 further comprises lamellae 33 extending along the entire width of the annular shaving track 30 between the outer peripheral rim 31 and the inner peripheral rim 32, in a substantially radial direction relative to the central axis 21 of the guard element 20. Apertures as present between the lamellae 33 constitute hair-entry slits 34 of the annular shaving track 30. Sides of the lamellae 33 constitute cutting surfaces suitable for cutting off hairs in cooperation with hair-cutting edges 16 of the hair-cutting element 15.

A hair-cutting action can be performed when the hair-cutting element 15 of the hair-cutting unit 10 is activated to rotate and a skin area is actually contacted by the guard element 20 at the position of the annular shaving track 30. When the hair-cutting unit 10 is moved over the skin area, it is achieved that hairs protruding from the skin area are caught in the hair-entry slits 34 of the guard element 20 and are cut off in that position as result of a cooperation between the cutting surfaces as present at the sides of the lamellae 33 delimiting the hair-entry slits 34 and the hair-cutting edges 16 of the rotating hair-cutting element 15. As mentioned, the guard element 20 is suitable to be used in a relatively small hair-cutting unit 10. In view thereof, a diameter of the base 22 of the guard element 20, which is the same as an outer diameter of the annular wall 23 of the guard element 20 in the shown example in view of the fact that the annular wall 23 has a straight cylindrical shape, is significantly smaller than a diameter of about 20 mm. For example, the diameter of the base 22 of the guard element 20 may be 9 mm. In general, the diameter as mentioned is in a range of 7 mm to 13 mm.

In the guard element 20 of the present embodiment, the annular shaving track 30 is of a design in which the hair-entry slits 34 are tapered in a radially inward direction, as can best be seen in FIG. 5. Further, in the guard element 20 of the present embodiment, a thickness of the lamellae 33 delimiting the hair-entry slits 34 increases in a radially outward direction, as can best be seen in FIG. 6. On the basis of the tapered shape of the hair-entry slits 34, it is achieved that a sufficiently large total hair-entry area is present in the guard element 20, despite of the relatively small size of the guard element 20. Further, the hair-entry slits 34 may still have an effective length, i.e. a dimension in the radial direction, of about 2.5 mm, and it is also possible for the hair-entry slits 34 to be wide enough at every position along its length to actually catch hairs during a shaving action. On the basis of the thickness profile of the lamellae 33, wherein the lamellae 33 have a larger thickness at radial positions which are more outward, disadvantageous effects such as skin doming in the relatively wide portions of the hair-entry slits 34 are counteracted.

As can best be seen in FIG. 6, both an inner surface 35 and an outer surface 36 of the annular shaving track 30 have a conical shape relative to the central axis 21 of the guard element 20, in a similar slanting orientation relative to the central axis 21, which is an oblique downward orientation in an outward radial direction in FIG. 6. One of the effects of the conical properties of the guard element 20 at the position of the annular shaving track 30 is that an advantageous distribution of pressure on the guard element 20 is obtained when the guard element 20 is pressed against a skin area during a shaving action.

In the embodiment as shown in FIG. 7, the hair-cutting element 15 comprises five legs 17 and a support structure 18 of the five legs 17, wherein each of the five legs 17 includes a hair-cutting edge 16, so that the total number of hair-cutting edges 16 is also five. In the hair-cutting unit 10, each of the five legs 17 extends towards the inner surface 35 of the annular shaving track 30 of the guard element 20, so that during rotation of the hair-cutting element 15, the hair-cutting edges 16 move over the annular shaving track 30 at the inside thereof. In view thereof, it is practical for the hair-cutting edges 16 to be designed so as to be compliant with the inner surface 35 of the annular shaving track 30, i.e. to have an orientation which is in accordance with the slanting orientation of the inner surface 35 of the annular shaving track 30.

Figure 8:
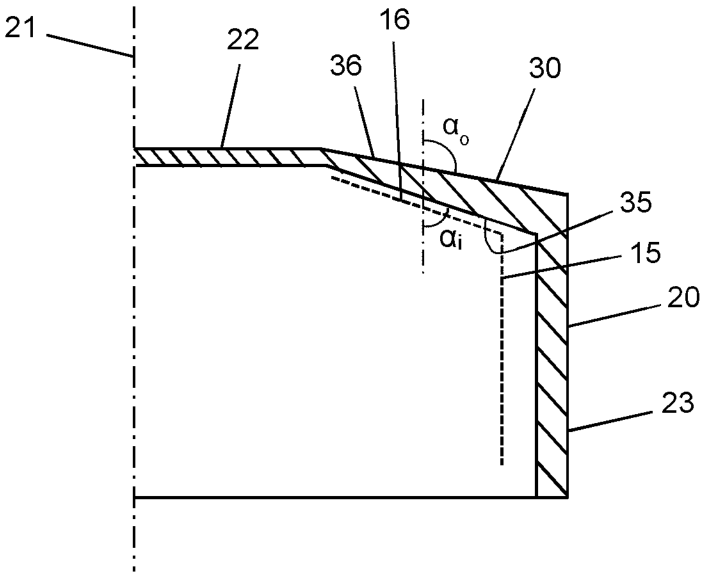
FIG. 8 illustrates orientations and outlines of an inner surface and an outer surface of a shaving track of the guard element and indicates how a cutting edge of the hair-cutting element is positioned with respect to the inner surface of the shaving track of the guard element in a hair-cutting unit of the hair-cutting appliance according to the invention.

FIG. 8 provides an illustration of a number of the special features of the guard element 20 as mentioned in the foregoing. In a diagrammatical fashion, FIG. 8 provides a view of a longitudinal section of the guard element 20, at one side of the central axis 21 of the guard element 20. The figure provides an illustration of the fact that the thickness of lamellae 33 of the annular shaving track 30 increases in a direction which is radially outward with respect to the central axis 21. Also, the figure provides an illustration of the fact that the annular shaving track 30 has a conical appearance, both at the inner surface 35 and the outer surface 36 thereof, and that the inner surface 35 and the outer surface 36 have a straight outline. According to the invention, an angle di of the annular shaving track 30 to the central axis 21 at the side of the inner surface 35 is in a range of 45° to 78°, and may more particularly be in a range of 60° to 75°. Further, it may be so that an angle do of the annular shaving track 30 to the central axis 21 at the side of the outer surface 36 is in a range of 90° to 120°.

In FIG. 8, an outline of a portion of the hair-cutting element 15 including a hair-cutting edge 16 is indicated by dashed lines. It is hereby illustrated that the hair-cutting edge 16 is designed so as to have a shape which is complementary to the shape of the inner surface 35 of the annular shaving track 30 of the guard element 20. On the basis of this fact, it is possible for the hair-cutting element 15 to have a self-centering functionality in the guard element 20, wherein the slanting orientation of the inner surface 35 of the annular shaving track 30 contributes to this effect. As a consequence, there is no need for having a central bearing for the hair-cutting element 15 in the guard element 20, which is advantageous in view of the fact that space inside the guard element 20 is limited due to the relatively small dimensions of the guard element 20, and also the fact that construction complexity is reduced.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Notable aspects of the invention can be summarized as follows. A guard element 20 which is configured to be used in a hair-cutting unit 10 as a guard for a rotatable hair-cutting element 15 of the hair-cutting unit 10 having at least one of the hair-cutting edges 16 is described. It is intended to use the guard element 20 in a hair-cutting appliance according to the invention having a plurality of relatively small hair-cutting units 10, wherein the number of hair-cutting units 10 is at least 19, for example 37 or even 61. In order to have a relatively small guard element 20, which is of robust and uncomplicated design, and which is capable of contributing to excellent hair-cutting results without causing skin irritation, it is proposed to let both an inner surface 35 and an outer surface 36 of an annular shaving track 30 of the guard element 20 have a conical shape relative to a central axis 21 of the guard element 20, in a similar slanting orientation relative to the central axis 21, in at least a hair-cutting portion of the annular shaving track 30. Further, it is proposed to let both the inner surface 35 and the outer surface 36 of the annular shaving track 30 have a straight outline and to let an angle $\alpha_i$ of the annular shaving track 30 to the central axis 21 at the side of the inner surface 35 be in a range of 45° to 78° as seen in a longitudinal section of the guard element 20 including the central axis 21, at either side of the central axis 21, in at least the hair-cutting portion of the annular shaving track 30 as mentioned.

5 Assuming that the annular shaving track 30 includes hair-entry slits 34 having a main extension in a radial direction and elongated lamellae 33 extending between the hair-entry slits 34, it may also be advantageous if at least some of the hair-entry slits 34 have a width distribution according to which a width of the respective hair-entry slits

34 increases in a radially outward direction along at least a major portion of a length of the respective hair-entry slits 34, and if further at least some of the lamellae 33 have a thickness distribution in which a thickness of the respective lamellae 33 increases in the radially outward direction along at least a major portion of a length of the respective lamellae 33.

The invention claimed is:

1. A hair-cutting appliance comprising at least nineteen hair-cutting units each comprising a guard element and a rotatably arranged hair-cutting element having at least one hair-cutting edge, wherein the guard element is configured as a guard for the hair-cutting element and arranged in each of the hair-cutting units to cover the hair-cutting element, wherein the guard element is substantially cup-shaped and comprises a base and an annular wall extending from the base, wherein a diameter of the base is in a range of 7 mm to 13 mm, wherein the base includes a shaving track which:

is annular about a central axis of the guard element;

comprises a plurality of hair-entry slits;

has an inner surface at a side of the shaving track and facing the hair-cutting element in each of the hair-cutting units, and an outer surface at an opposite side of the shaving track; and has a hair-cutting portion which is designed to cover the hair-cutting element in each of the hair-cutting units at a position of the annular shaving track followed by the at least one hair-cutting edge of the hair-cutting element during rotation of the hair-cutting element;

wherein, in at least the hair-cutting portion of the shaving track and as seen in a longitudinal section of the guard element including the central axis, at either side of the central axis both the inner surface and the outer surface of the shaving track have:

a conical shape relative to the central axis with a similar slanting orientation relative to the central axis; and a straight outline, wherein the inner surface of the shaving track is oriented relative to the central axis at an inclination angle ($\alpha_i$) in a range of 45° to 78°.

2. The hair-cutting appliance according to claim 1, wherein, in at least the hair-cutting portion of the shaving track, the inclination angle ($\alpha_i$) of the inner surface of the shaving track is in a range of 60° to 75°.

3. The hair-cutting appliance according to claim 1, wherein, in at least the hair-cutting portion of the shaving track and as seen in said longitudinal section of the guard element, at either side of the central axis the outer surface of the shaving track is oriented relative to the central axis at an inclination angle ($\alpha_o$) in a range of 90° to 120°.

4. The hair-cutting appliance according to claim 1, wherein:

the plurality of hair-entry slits of the shaving track have a main extension in a radial direction relative to the central axis the shaving track further comprises elongated lamellae extending between the hair-entry slits, at least some of the plurality of hair-entry slits have a width distribution according to which a width of the respective hair-entry slits increases in a radially outward direction along at least a major portion of a length of the respective hair-entry slits, and at least some of the lamellae have a thickness distribution in which a thickness of the respective lamellae increases in the radially outward direction along at least a major portion of a length of the respective lamellae.

5. The hair-cutting appliance according to claim 4, wherein, along at least said major portion of the length of the respective lamellae, in each radial position the thickness of the respective lamellae is proportional to the width of the hair-entry slits.

6. The hair-cutting appliance according to claim 4, wherein a ratio between a local slit width and a local lamella thickness is between 2.2 and 6.

7. The hair-cutting appliance according to claim 4, wherein the respective hair-entry slits are tapered in a radially inward direction.

8. The hair-cutting appliance according to claim 4, wherein the respective lamellae have a substantially constant width along at least said major portion of their length.

9. The hair-cutting appliance according to claim 4, wherein the width of the respective hair-entry slits is at least 250 μm at any radial position.

10. The hair-cutting appliance according to claim 1, wherein, as seen in said longitudinal section of the guard element, the at least one hair-cutting edge of the hair-cutting element has a shape which is complementary to the shape of the inner surface of the shaving track of the guard element at a position of at least the hair-cutting portion of the shaving track.

11. The hair-cutting appliance according to claim 1, wherein:

the hair-cutting element comprises a plurality of legs and a support structure for supporting the plurality of legs, each of the plurality of legs extends towards the inner surface of the shaving track of the guard element and includes a hair-cutting edge from the at least one hair-cutting edge, and the number of the plurality of the legs is selected from the group consisting of three, four or five legs.

12. The hair-cutting appliance according to claim 1, further comprising a driving mechanism configured to act on the hair-cutting element of at least one of the hair-cutting units for realizing rotation of the hair-cutting element during operation of the hair-cutting appliance at a rotation speed resulting in a frequency of the at least one hair-cutting edge of the hair-cutting element passing the respective hair-entry slits of the guard element being in a range of 315-535 passes per second.

* * * * *